United States Patent
Mukaihara et al.

(10) Patent No.: US 10,563,612 B2
(45) Date of Patent: Feb. 18, 2020

(54) CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Osamu Mukaihara, Hitachinaka (JP); Satoshi Usui, Hitachinaka (JP); Masahiro Toyohara, Hitachinaka (JP)

(73) Assignee: Hitachi Automotive Systems, Inc., Ibaraki (JP)

( * ) Notice: Subject to any disclaimer, the term of this patent is extended or adjusted under 35 U.S.C. 154(b) by 0 days.

(21) Appl. No.: 16/098,396

(22) PCT Filed: Mar. 22, 2017

(86) PCT No.: PCT/JP2017/011299
§ 371 (c)(1),
(2) Date: Nov. 1, 2018

(87) PCT Pub. No.: WO2017/212738
PCT Pub. Date: Dec. 14, 2017

(65) Prior Publication Data
US 2019/0153974 A1    May 23, 2019

(30) Foreign Application Priority Data
Jun. 7, 2016 (JP) ................................ 2016-113878

(51) Int. Cl.
*F02D 41/40* (2006.01)
*F02D 13/02* (2006.01)
(Continued)

(52) U.S. Cl.
CPC ............ *F02D 41/401* (2013.01); *F01L 1/356* (2013.01); *F01L 13/00* (2013.01); *F02D 13/02* (2013.01);
(Continued)

(58) Field of Classification Search
CPC ........ F02D 41/40; F02D 41/401; F02D 13/02; F02D 13/0207; F02D 2200/025;
(Continued)

(56) References Cited

U.S. PATENT DOCUMENTS

2006/0118089 A1    6/2006 Tokuo et al.

FOREIGN PATENT DOCUMENTS

| JP | 2006-161661 A | 6/2006 |
| JP | 4228799 B2 | 12/2008 |
| JP | 2014-001715 A | 1/2014 |

OTHER PUBLICATIONS

International Search Report dated Jun. 13, 2017 for the International Application No. PCT/JP2017/011299.

*Primary Examiner* — Hieu T Vo
(74) *Attorney, Agent, or Firm* — Volpe and Koenig, P.C.

(57) ABSTRACT

Provided is a control device for an internal combustion engine capable of avoiding deterioration of combustion and reliably suppressing synthetic noise of a high pressure fuel pump and a fuel injection valve without affecting an operating state of the internal combustion engine. Therefore, when it is determined that there is synthetic noise of a high pressure fuel pump and a fuel injection valve, an operating angle of a variable valve mechanism provided in the internal combustion engine is made variable while satisfying a fuel injection request of the fuel injection valve.

10 Claims, 8 Drawing Sheets

(51) Int. Cl.
*F01L 13/00* (2006.01)
*F02M 59/44* (2006.01)
*F02M 63/00* (2006.01)
*F01L 1/356* (2006.01)

(52) U.S. Cl.
CPC ......... *F02D 13/0207* (2013.01); *F02M 59/44* (2013.01); *F02M 63/00* (2013.01); *F02D 2200/025* (2013.01); *Y02T 10/18* (2013.01)

(58) Field of Classification Search
CPC ......... F02M 59/44; F02M 63/00; F01L 1/356; F01L 13/00; Y02T 10/18
See application file for complete search history.

CONTROL DEVICE FOR INTERNAL COMBUSTION ENGINE

TECHNICAL FIELD

The present invention relates to a control device for an internal combustion engine, and more particularly to a control device for an in-cylinder direct injection internal combustion engine that directly injects fuel into a cylinder.

BACKGROUND ART

Conventional variable valve mechanisms are known, that can make valve opening timing and closing timing (hereinafter collectively referred to as valve timing) and a lift amount of an intake valve and an exhaust valve, variable. The variable valve mechanisms greatly contribute to the improvement of thermal efficiency of internal combustion engines by realizing the valve timing and the lift amount suitable for an operating state of internal combustion engines. On the other hand, an in-cylinder direct injection internal combustion engine is an internal combustion engine that injects fuel applied with pressure (pressurized) by a high pressure fuel pump directly into a cylinder from a fuel injection valve. In recent years, regulations on the exhaust performance of internal combustion engines have been strengthened on a worldwide scale, and in particular in in-cylinder direct injection internal combustion engines, various techniques aimed at improving homogeneity and reducing unburned fuel as countermeasures have been invented and practically used.

Examples of such countermeasure techniques include, for example, a method of increasing the fuel pressure of injection into the cylinder to promote atomization of the fuel in order to improve homogeneity, and multistage injection control of suppressing the fuel injection length (time width of fuel injection), to reduce fuel adhesion to the piston and wall flow in the cylinder. However, when these technologies are applied, it is indispensable to mechanically improve the fuel system and control the fuel system with high accuracy. For example, in order to achieve a high fuel pressure, an improvement of a high pressure fuel pump suitable for the high fuel pressure is desired, so that a return spring corresponding to the fluid force of the high fuel pressure fuel is required, while responsiveness in operation deteriorates, and therefore, it is necessary to improve additional mechanisms and components that can satisfy these requirements. However, in such a complicated configuration, there is a possibility that noise accompanying driving of the high pressure fuel pump becomes high or the number of times of noise increases. As the application range of multistage injection control is required to increase and the number of times of multistage injection is required to increase, the number of times of noise accompanying driving of the fuel injection valve tends to increase as a whole.

Under such circumstances, it is concerned that, as compared with the prior art, drive noises generated when each of the high pressure fuel pump and the fuel injection valve is driven overlap each other, thereby increasing the opportunity (number of times) of synthetic noise that causes sensuously uncomfortable feeling. In particular, the noise during the idling operation is not acceptable from the viewpoint of merchantability.

As a technique for reducing such synthetic noise, there is a technique that has already been devised, the technique of making driving of a high pressure fuel pump and a fuel injection valve, specifically, opening and closing timing of a spill valve for adjusting the pressurization state of a high pressure fuel pump, the drive timing (injection timing) of a fuel injection valve, or the like, variable, on the basis of peak noise of synthetic noise (for example, see PTL 1 and PTL 2 below).

CITATION LIST

Patent Literature

PTL 1: JP 2014-001715 A
PTL 2: JP 2006-161661 A

SUMMARY OF INVENTION

Technical Problem

However, for example, when simply the opening and closing timing of the spill valve of the high pressure fuel pump is made variable, the discharge amount of the high pressure fuel pump changes every time, so that the fuel pressure pulsation increases, which causes large shot variation of the injection amount, and therefore, the combustion stability may be impaired. When the drive timing of a fuel injection valve (injection timing including multistage injection) is made variable, the injection timing determined from a combustion request of an internal combustion engine is ignored, which also may cause deterioration of combustion.

The present invention has been made in view of the above circumstances, and it is an object of the present invention to provide a control device for an internal combustion engine capable of avoiding deterioration of combustion and reliably suppressing synthetic noise of a high pressure fuel pump and a fuel injection valve without affecting an operating state of the internal combustion engine.

Solution to Problem

In order to solve the above problem, a control device for an internal combustion engine according to the present invention is a control device for an in-cylinder direct injection internal combustion engine including: a fuel injection valve that directly injects fuel into a cylinder; a high pressure fuel pump that pressurizes fuel to be supplied to the fuel injection valve; and a variable valve mechanism that can make a valve timing or a lift amount of an intake valve or an exhaust valve variable, in which, the control device predicts occurrence of generation of synthetic noise generated when drive noise of the fuel injection valve and drive noise of the high pressure fuel pump overlap with each other in timing, and when determining that there is synthetic noise, makes an operating angle of the variable valve mechanism variable while satisfying a fuel injection request of the fuel injection valve.

Advantageous Effects of Invention

According to the present invention, when it is determined that there is synthetic noise of a high pressure fuel pump and a fuel injection valve, an operating angle of a variable valve mechanism provided in the internal combustion engine is made variable while a fuel injection request (for example, a required fuel pressure or a required injection amount) of a fuel injection valve is satisfied, so that it is possible to avoid deterioration of combustion and reliably reduce synthetic noise without affecting an operating state of the internal combustion engine, and thereby improving merchantability of a fuel sub system.

The problems, configurations, and effects other than those described above will be clarified from the description of the embodiments below.

DESCRIPTION OF EMBODIMENTS

Hereinafter, an embodiment of a control device for an internal combustion engine according to the present invention will be described with reference to the drawings.

Figure 1:
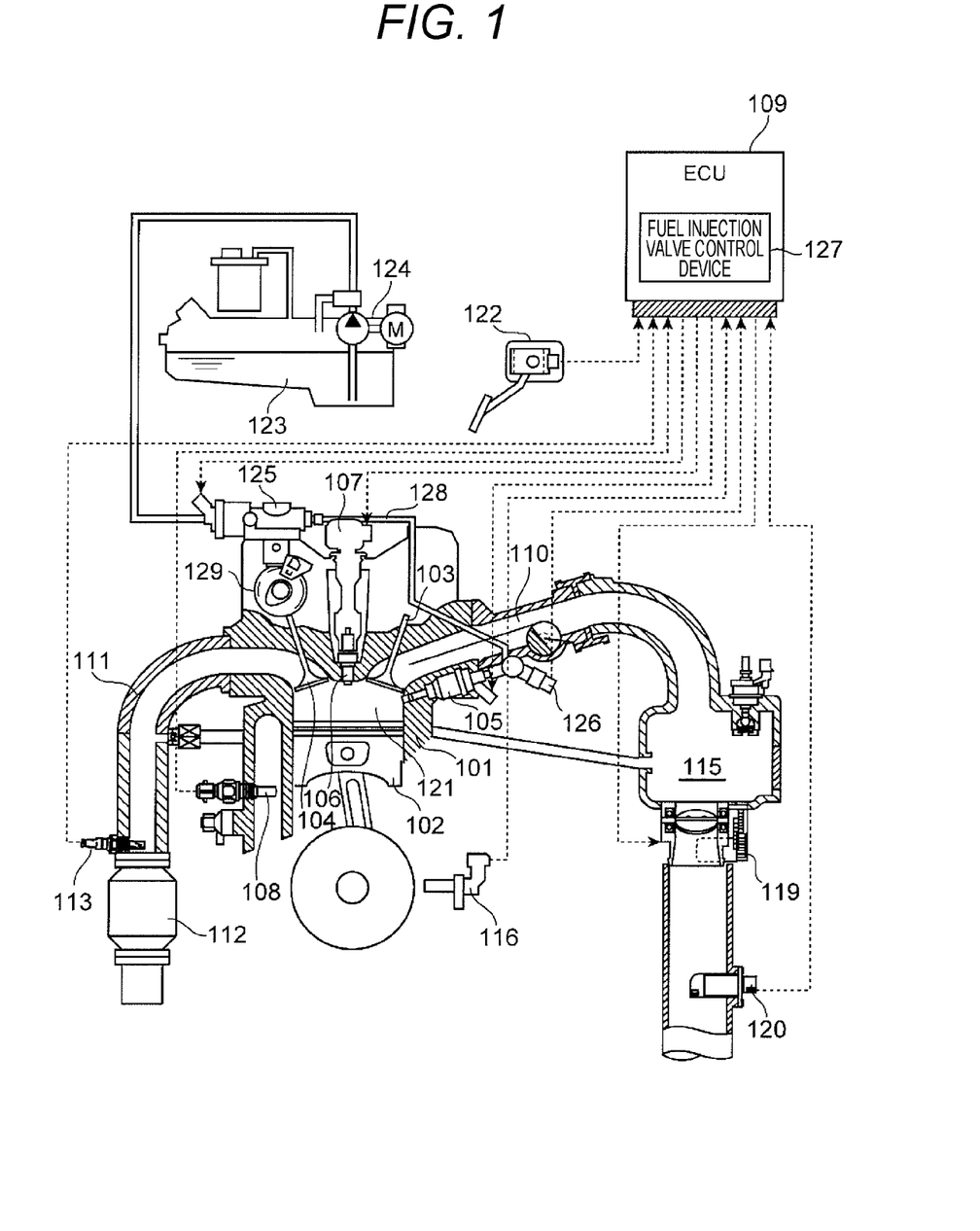
FIG. 1 is an overall configuration diagram of an internal combustion engine mounted with a control device (ECU) for an internal combustion engine according to the present invention.

FIG. 1 shows a basic configuration of an internal combustion engine (in-cylinder direct injection internal combustion engine) mounted with a control device (ECU) for an internal combustion engine according to the present invention.

In FIG. 1, air (intake air) sucked into an internal combustion engine (101) passes through an air flowmeter (AFM) (120), sucked into a throttle valve (119) and a collector (115) in this order, and then supplied to a combustion chamber (121) via an intake pipe (110) and an intake valve (103) provided in each cylinder.

On the other hand, fuel is sent from a fuel tank (123) to a high pressure fuel pump (125) (a pressurizing chamber thereof) included in the internal combustion engine (101) by a low pressure fuel pump (124), and the high pressure fuel pump (125) vertically moves a plunger included in the high pressure fuel pump (125) by power transmitted from an exhaust camshaft (not shown) including (coupled with) an exhaust cam (a cam provided on an exhaust valve (104) side) (129), and applies pressure (pressurizes) the fuel in the high pressure fuel pump (125). In order to make a pressure of fuel (fuel pressure) discharged from the high pressure fuel pump (125) a desired pressure, a solenoid controls an opening and closing valve (also referred to as a spill valve) included in a corresponding discharging port, on the basis of a control command value from an engine control unit (ECU) (109).

As a result, the high pressure fuel is sent to a fuel injection valve (105) via a high pressure fuel pipe (128), and the fuel injection valve (105) directly injects the fuel to the combustion chamber (121) on the basis of a command of a fuel injection valve control device (127) included in the ECU (109).

In order to control the high pressure fuel pump (125), the internal combustion engine (101) includes a fuel pressure sensor (126) for measuring the pressure in the high pressure fuel pipe (128), and the ECU (109) generally performs so called feedback control so as to make the fuel pressure in the high pressure fuel pipe (128) reaches a desired pressure. The internal combustion engine (101) includes a spark coil (107) and a spark plug (106) for each combustion chamber (121), and energization control to the spark coil (107) and spark control by the spark plug (106) are performed at a desired timing by the ECU (109).

As a result, mixture in which intake air and the fuel are mixed in the combustion chamber (121) is burned by spark emitted from the spark plug (106), and the pressure of this combustion pushes down a piston (102).

The exhaust gas generated by the combustion is discharged to an exhaust pipe (111) via an exhaust valve (104), and a three-way catalyst (112) for purifying the exhaust gas is included on the exhaust pipe (111).

The ECU (109) has the built-in fuel injection valve control device (127), signals are input to the built-in fuel injection valve control device, and the signals are of a crank angle sensor (116) that measures a crankshaft angle (not shown) of the internal combustion engine (101), the AFM (120) indicating an intake air amount, an oxygen sensor (113) that detects the oxygen concentration in the exhaust gas, an accelerator opening degree sensor (122) indicating the degree of opening of the accelerator operated by the driver, the fuel pressure sensor (126), or the like.

More specifically for the signals input from each sensor, the ECU (109) calculates a required torque of the internal combustion engine (101) from the signal of the accelerator opening degree sensor (122) and determines whether the state is an idle state, and the like. The ECU (109) include a rotational speed detecting means that operates the rotational speed of the internal combustion engine (101) (hereinafter referred to as the engine rotational speed) from the signal of the crank angle sensor (116), and a determination means that determines whether the state is a state in which the three-way catalyst (112) is warmed up, from cooling water temperature of the internal combustion engine (101) obtained from a water temperature sensor (108), elapsed time after starting the internal combustion engine (101), or the like.

The ECU (109) calculates the intake air amount necessary for the internal combustion engine (101), from the required torque of the internal combustion engine (101) described above, and outputs an opening degree signal corresponding to the calculated amount to a throttle valve (119). The fuel injection valve control device (127) calculates a fuel amount corresponding to the intake air amount, outputs a fuel injection signal corresponding to the calculated fuel amount to the fuel injection valve (105), and outputs a spark signal to the spark coil (107).

Opening and closing valve timing (valve timing) and a lift amount of the intake valve (103) and the exhaust valve (104) are determined by a cam shape (also referred to as a cam profile) of an intake camshaft (not shown) and an exhaust camshaft (not shown), respectively.

The valve timing and the lift amount of the intake valve (103) and the exhaust valve (104) can be varied by a variable valve mechanism included in the intake cam and the exhaust cam (the detailed structure will be described later).

Next, with reference to FIG. 2, basic control of the high pressure fuel pump (125) included in the in-cylinder direct injection internal combustion engine (101) shown in FIG. 1 will be described. In the description of the present specification, the high pressure fuel pump (125) is driven by the exhaust camshaft. However, the operation and effect of the present invention do not change even in the high pressure fuel pump (125) driven by the intake camshaft (that is, driven by the cam on the intake valve (103) side).

Figure 2:
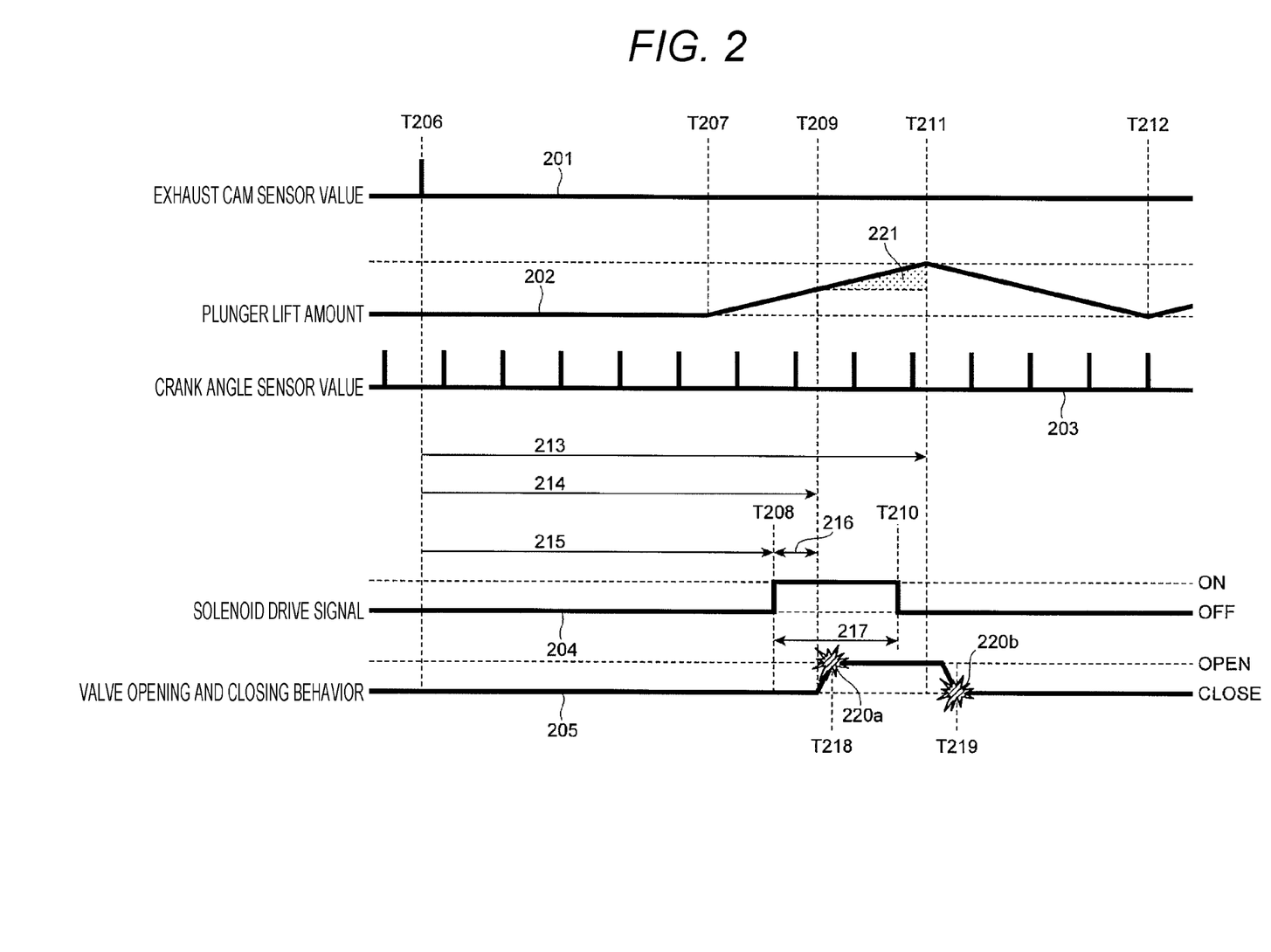
FIG. 2 is a control explanatory diagram for explaining control of a high pressure fuel pump.

FIG. 2 shows a value (201) of the exhaust cam sensor for detecting the position of the exhaust cam as a drive shaft of the high pressure fuel pump (125), a plunger lift amount (202) indicating a lift amount of the plunger included in the high pressure fuel pump (125), and a value (203) of the crank angle sensor (116) (hereinafter, simply referred to as a crank angle) for detecting the position of the crank angle. When fuel is supplied from the high pressure fuel pump (125) to the high pressure fuel pipe (128), a desired amount of fuel is discharged by controlling an opening and closing valve included in a discharge port of the high pressure fuel pump (125). FIG. 2 also shows a drive signal (204) to the solenoid of the opening and closing valve, and a behavior (205) of the opening and closing valve.

First, when the internal combustion engine (101) starts operation, the plunger lift amount (202) of the high pressure fuel pump (125) performs vertical motion in accordance with rotational operation of a cam (129) rotated by the exhaust cam (cam rotated by the internal combustion engine (101)). In FIG. 2, it rises from T207, becomes a top dead center (TDC) at T211, becomes a bottom dead center (BDC) at T212, and this is repeated thereafter. The period (221) from T209 in which a predetermined time (216) has elapsed from an ON timing (drive start timing) (T208) of a solenoid drive signal (204) described later to the TDC (T211) of the high pressure fuel pump (125) corresponds to the discharge amount of the high pressure fuel pump (125).

The crank angle sensor (116) also detects the position information of the crank angle by the operation of the internal combustion engine (101), and operates information necessary for angle control, in the ECU (109) on the basis of this value (203) of the crank angle sensor (116). The control of the high pressure fuel pump (125) is performed on the basis of the position information of the exhaust cam sensor value (201), and in this drawing, the signal of the exhaust cam sensor is input at T206.

The angle (213) as the control reference position, from the input timing (T206) of the exhaust cam signal to the top dead center position (T211) of the high pressure fuel pump (125) is determined by the profile of a pump cam (drive cam) (not shown) that operates the plunger of the high pressure fuel pump (125), and the period (217) in which the solenoid drive signal (204) is turned ON is determined by a spring constant of a return spring included for closing the opening and closing valve, the fuel pressure of the high pressure fuel pipe (128), electrical characteristics of the solenoid, and the like.

The response time (216) from the timing (T208) of turning ON of the solenoid drive signal (204) to the timing (T209) at which the opening and closing valve actually starts opening is also determined from the characteristics of the high pressure fuel pump (125). Thus, in general, these pieces of information are set in advance as ROM constants and battery voltage correction or the like is performed, so that the ON timing (drive start timing) (T208) and the OFF timing (drive end timing) (T210) of the solenoid drive signal (204) can be obtained.

The ON period (217) of the solenoid drive signal is a time requirement. By converting this into an angle on the basis of the rotational speed information of the internal combustion engine (101), the ECU (109) can handle all the parameters as known information, and uses the angle (215) from the control reference position (T206) described above to the ON timing (T208) of the solenoid drive signal (204) and the ON period (217) of the solenoid drive signal (204), to control the high pressure fuel pump (125).

As described above, the valve opening and closing behavior (205) starts the valve opening operation from T209, and complete the valve opening operation when the opening and closing valve collides with the valve opening stopper (T218). At this time, the pump opening noise (220a) accompanying the collision occurs, and as the mechanism improvement with the high fuel pressure, a plurality of times of noise may be generated in some cases. After the top dead center (T211) of the high pressure fuel pump (125) is exceeded, the opening and closing valve starts the valve closing operation and eventually collides with a valve closing side stopper to complete the valve closing operation (T219). At this time, pump closing noise (220b) also occurs similarly to the valve opening operation. By moving the solenoid driving ON period (217) to the advance side (moving to the left side in FIG. 2), T209 is advanced so that the discharge amount (221) can be increased. Conversely, by moving the solenoid driving ON period (217) to the retard side (moving to the right side in FIG. 2), T209 is retarded so that the discharge amount (221) can be reduced. Regardless of the solenoid driving ON period (217), the valve closing timing is a timing depending on the top dead center (T211) of the high pressure fuel pump (125).

In FIG. 2, reference numeral 214 is an angle from the control reference position (T206) to the timing (T209) at which the opening and closing valve actually starts opening.

Next, with reference to FIG. 3, the configuration of the variable valve mechanism included in the in-cylinder direct injection internal combustion engine (101) shown in FIG. 1 will be described.

As described above, since the intake valve (103) and the exhaust valve (104) included in the internal combustion engine (101) are determined by the cam profile, although there is a difference for each internal combustion engine (101), operation characteristics of the intake valve (103) and the exhaust valve (104) do not change. However, since the optimal valve timings are different for each operating state of the internal combustion engine (101), recent internal combustion engines have variable valve mechanisms capable of making the valve timing and the lift amount of the intake valve (103) and the exhaust valve (104) variable. FIG. 3 schematically shows a valve timing control system (VTC) capable of varying only the valve timings of the intake valve (103) and the exhaust valve (104).

In other variable valve mechanisms, as long as the phase difference between the crank angle and the cam angle can be varied, the function and effect thereof does not change.

Figure 3:
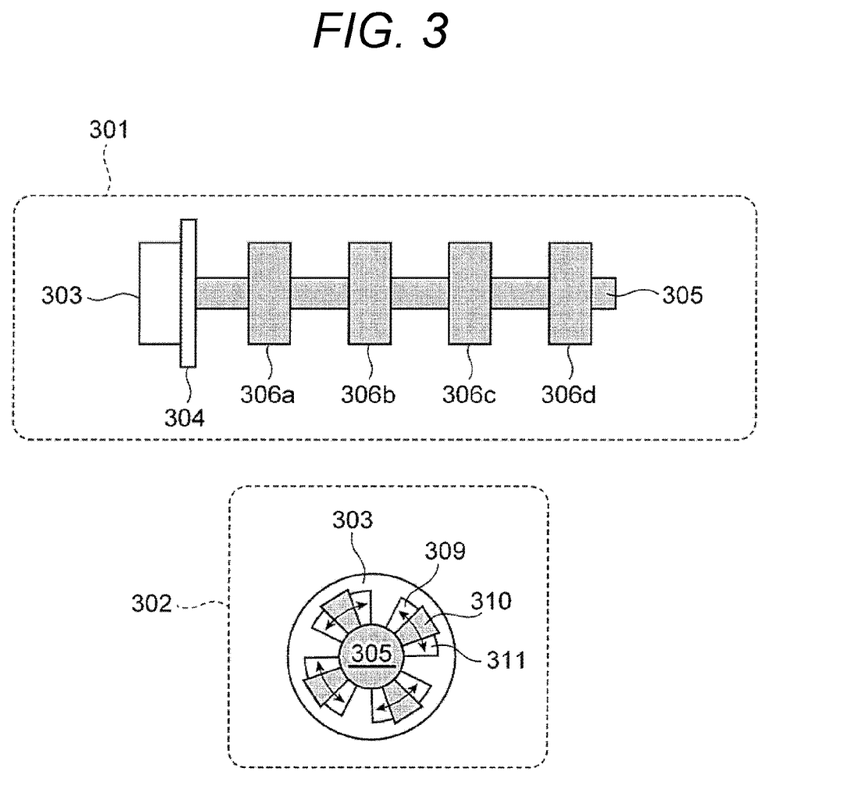
FIG. 3 is an explanatory diagram for schematically explaining a configuration of a variable valve mechanism.

First, reference numeral 301 in FIG. 3 is a schematic view of a camshaft (305) assuming a four-cylinder internal combustion engine as seen from the side. A pulley (304) is included at one end of the camshaft (305), and a pulley (304) is rotated by power from the crankshaft via a belt, a chain, a gear, or the like to rotate cams (306a, 306b, 306c, 306d) included in each cylinder, and the intake valve (103) or the exhaust valve (104) perform the valve opening and closing operation. A VTC mechanism part (303) composing the variable valve mechanism is included at the further tip end portion from the pulley (304).

In FIG. 3, reference numeral 302 schematically shows the internal configuration of the above-described VTC mechanism part (303). Although the pulley (304) operates in rotation synchronization with the internal combustion engine (101), a partition is provided on the outer peripheral portion, and the central portion is coupled to the camshaft (305) and includes a convex part (310), so that the pulley (304) has a configuration in which two spaces (309, 311) are formed with the convex part (310) as a boundary.

The ECU (109) drives the solenoid on the basis of the operating state of the internal combustion engine (101), so that the ECU (109) can supply oil to one of the two spaces (309, 311), make the position of the convex part (310) by hydraulic pressure generated by the oil supply, so that the by driving a solenoid valve (solenoid), and provide a phase in the rotation operation of the camshaft (305) with respect to the crankshaft.

Next, with reference to FIG. 4, the operation of the variable valve mechanism included in the in-cylinder direct injection internal combustion engine (101) shown in FIG. 1, particularly the operation of the VTC mechanism part (303) will be described.

Figure 4:
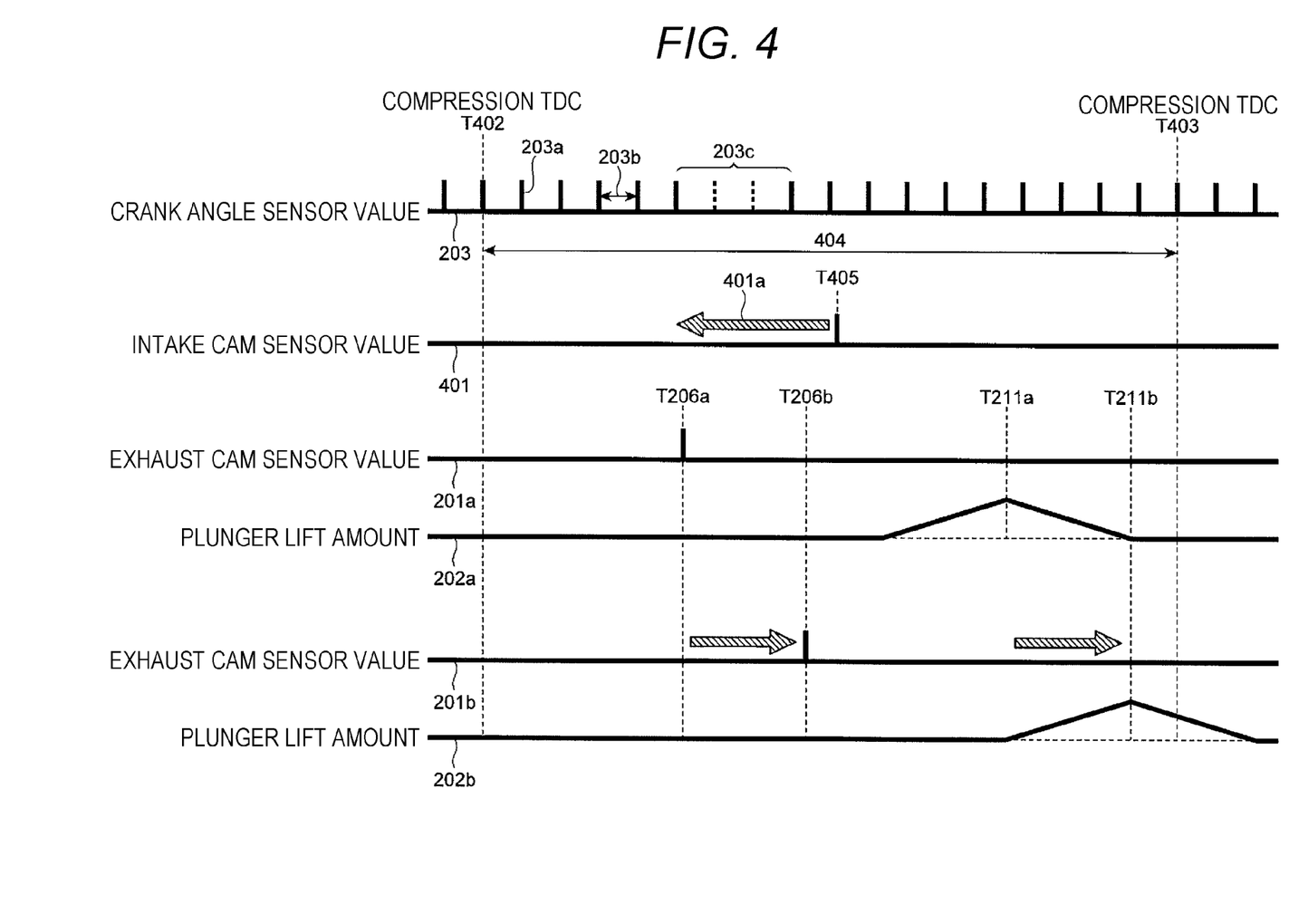
FIG. 4 is an operation explanatory diagram for explaining operation of the variable valve mechanism.

FIG. 4 shows the value (203) of the crank angle sensor (116), the value (401) of the intake cam sensor showing the position of the intake cam, and the values (201a, 201b) of the exhaust cam sensor showing the position of the exhaust cam, in this order from above.

The crank angle sensor value (203) has a normal part with teeth (203a) to be input every predetermined angular interval (203b) and a tooth missing part (203c) with a predetermined number (two teeth in FIG. 4) of teeth missing, and in general, at least one or more tooth missing part (203c) exist while the crankshaft rotates once. In an internal combustion engine having a plurality of cylinders, compressed top dead centers (TDC: T402, T403) of each cylinder exist at regular intervals (404), and all the basic control of the internal combustion engine such as fuel injection and spark are all performed by the absolute angle of this crank angle. The interval (404) between the compressed TDCs is obtained by a combustion stroke period [720 deg]/the number of cylinders of the internal combustion engine.

The crank angle sensor value (crank angle) (203) is grasped by grasping the number of teeth (203a) input every predetermined interval (203b) with the tooth missing part (203c) as a basis. However, since in the combustion stroke of the internal combustion engine (101), the crankshaft performs two rotations (=720 deg), it is impossible to judge the absolute angle on the basis of only the information of the crank angle (203), and generally cylinder discrimination is performed in combination with at least one or more input patterns of the intake cam sensor value (401) or the exhaust cam sensor value (201a, 202b), so that the crank angle is grasped. In FIG. 4, for convenience of explanation, both the intake cam sensor value (401) and the exhaust cam sensor value (201a, 201b) are shown as one input tooth.

From these facts, the intake cam sensor value (401) and the exhaust cam sensor value (201a, 201b) are input while maintaining a constant phase difference with respect to the crank angle.

However, when oil is filled in the space (311) formed with the convex part (310) as the boundary from the operation of the VTC mechanism part (303) described in FIG. 3, since the intake cam sensor value (401) moves to an advance side (401a) in accordance with the change in the operating angle of the VTC mechanism part (303), the input of the intake cam sensor moves from T405 to the advance side. Similarly, with regard to the exhaust cam, the space (309) shown in FIG. 3 is filled with oil, so that the camshaft can be moved to the retard side in accordance with the change in the operating angle of the VTC mechanism part (303).

In FIG. 4, reference numeral 201a indicates a state where the VTC mechanism part (303) is not operated, and 201b indicates a state in which the exhaust cam (camshaft thereof) has moved to the retard side. As a result, the plunger lift amount (202a) of the high pressure fuel pump (125) also moves to the retard side (202b) and the input signal of the exhaust cam moves from T206a to T206b, so that the top dead position (T211a) shown in the plunger lift (202a, 202b) also moves to T211b.

The operation of the VTC mechanism part (303) described here is an example. For example, there is a mechanism in which the default position of the VTC is provided at an intermediate position of the VTC operating angle, and in that case, in both cases in which the VTC mechanism part (303) is included in the intake cam or the exhaust cam, the camshaft can be moved to both the advance side and the retard side, while the positional relationship between the cam position and the top dead center of the high pressure fuel pump (125) has the same characteristics.

In the present embodiment, presence of generation of the synthetic noise generated when generation timing of the valve opening and closing noise (516a, 516b) of the fuel injection valve (105) to be described later overlaps with generation timing of the valve opening and closing noise (220a, 220b) of the high pressure fuel pump (125) is predicted (synthetic noise prediction means). When it is determined that there is synthetic noise, the VTC mechanism part (303) is made variable as described above, and thereby, the phase difference between the crank angle and the cam angle is changed by the change of the operating angle of the VTC mechanism part (303), so that the synthetic noise is suppressed.

Figure 5:
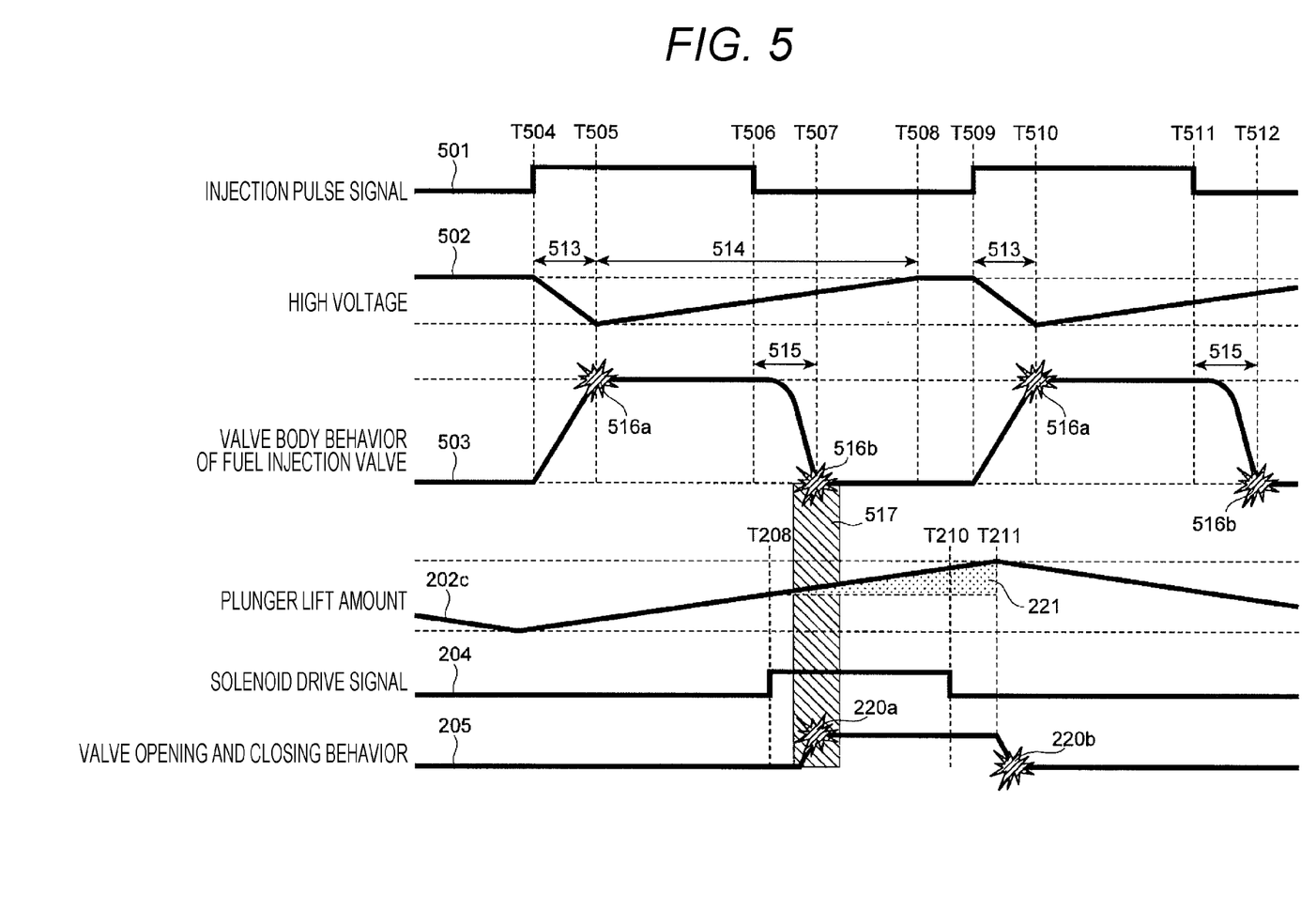
FIG. 5 is an explanatory diagram for explaining generation of synthetic noise.

Next, with reference to FIG. 5, the mechanism of generation of the synthetic noise in the in-cylinder direct injection internal combustion engine (101) shown in FIG. 1 will be described. FIG. 5 shows an injection pulse signal (501) indicating the driving state of the fuel injection valve (105), a high voltage (502) used for the valve opening current of the fuel injection valve (105), a valve body behavior (503) indicating valve operation of the fuel injection valve (105), a plunger lift amount (202c) of the high pressure fuel pump (125), the solenoid drive signal (204), and the valve opening and closing behavior (205) in this order from above.

First, the operation of the fuel injection valve (105) will be described. The injection pulse signal (501) instructs the injection operation twice in FIG. 5. That is, in the first time, the instruction is the ON (drive start) command at T504 and the OFF (drive end) command at T506, and in the second time, the instruction is the ON command at T509 and the OFF command at T511. A high voltage (502) drops in a period (513) of application of a valve opening current to the fuel injection valve (105), from the timing T504 or T509 at which the ON command of the injection pulse signal (501) is generated. In FIG. 5, this corresponds to T504 to T505 or T509 to T510.

Since, after a predetermined valve opening current is applied, the drive current of the fuel injection valve (105) is switched to a valve opening holding current by the battery voltage, the use of the high voltage is stopped, and for the next preparation to be used, pressurizing operation is performed. This corresponds to the period (514) from T505 to T508. At T508, the voltage recovers to a predetermined high voltage, and the above operation is repeated from the subsequent injection (ON) command T509.

On the other hand, in the valve body behavior (503) of the fuel injection valve (105), the drive current is applied at the pulse ON timing (drive start timing) (T504), the valve opening action is started, and the full lift state is reached when the valve body collides with the valve opening stopper (T505). Here, similarly to the high pressure fuel pump (125), valve opening noise (516*a*) due to valve opening operation occurs, and from the timing (drive end timing) (T506) at which the injection pulse signal (501) is turned OFF, the valve body behavior (503) performs the valve closing operation, and the valve closing noise (516*b*) also occurs even when the valve closing is completed (T507).

Since the generation timings of these valve opening and closing noises (516*a*, 516*b*) are determined by the strength of the return spring included in the fuel injection valve (105) and the fuel pressure in the high pressure fuel pipe (128), it is considered that these generation timings can be predicted from the ON timing or the OFF timing of the injection pulse signal (501).

In the operation of the fuel injection valve (105) shown in FIG. 5, multi-stage injection is performed, and consideration is necessary so that both the pressurizing operation period (514) of the high voltage (502) and the valve closing response (515) of the valve body behavior (503) do not affect subsequent operation. Therefore, it is necessary to set the injection interval (T504 to T509 or T506 to T509) for a predetermined period or more.

Since the plunger lift amount (202*c*) of the high pressure fuel pump (125), the solenoid drive signal (204), and the valve opening and closing behavior (205) have been described with reference to FIG. 2, the detailed description will be omitted here. In FIG. 5, the valve closing noise (516*b*) of the fuel injection valve (105) generated at T507 and the valve opening noise (220*a*) of the high pressure fuel pump (125) occur at substantially the same timing. In this specification, this state is referred to as synthetic noise, and for the purpose of avoiding a period (517) in which this synthetic noise occurs (within a predetermined range), the timing at which each of the valve opening and closing noise (516*a*, 516*b*) of the fuel injection valve (105) and the drive noise (220*a*, 220*b*) of the high pressure fuel pump (125) occurs is predicted, and when it is predicted that the timings overlap with each other within a predetermined range (517), the phase difference between the crank angle and the cam angle is changed by using the above-described variable valve mechanism (changing the operating angle of the variable valve mechanism), that is, the valve opening and closing behavior (205) of the high pressure fuel pump (125) is changed (shifted) to the advance side or the retard side with respect to the valve body behavior (503) of the fuel injection valve (105).

Here, the synthetic noise prediction means that predicts occurrence of the synthetic noise generated when the drive noise (516*a*, 516*b*) of the fuel injection valve (105) and the drive noise (220*a*, 220*b*) of the high pressure fuel pump (125) overlap with each other in timing, sets a fuel injection valve monitoring period including: a fuel injection valve opening monitoring period (610) in which a predetermined period (for example, 513) from the ON timing (T504) of the injection pulse signal (501) is provided and monitoring of the opening noise (516*a*) is performed; and a fuel injection valve closing monitoring period (611) in which a predetermined period (for example, 515) from the OFF timing (T506) of the injection pulse signal (501) is set, and monitoring of the valve closing noise (516*b*) is performed. A high pressure fuel pump monitoring period including: high pressure fuel pump opening monitoring period (222*a*) in which monitoring of the valve opening noise (220*a*) of the high pressure fuel pump (125) is performed and a high pressure fuel pump valve closing monitoring period (222*b*) in which monitoring of the valve closing noise (220*b*) of the high pressure fuel pump (125) is performed is set. Since any of the top dead center (T211) and the bottom dead center (T212) of the plunger (pump piston) lift amount (202) described in FIG. 2, the ON timing (T206) and OFF timing (T210) of the solenoid drive signal (204) has a temporal correspondence relationship with the valve opening noise (220*a*) and the valve closing noise (220*b*) of the high pressure fuel pump (125) described above. Thus, a high pressure fuel pump monitoring period is set in which a predetermined period is set from at least any one or more of the ON timing (T206) and OFF timing (T210) of the solenoid drive signal (204), and the top dead center (T211) and the bottom dead center (T212) of the plunger (pump piston) lift amount (202). In the case in which the fuel injection valve monitoring period and the high pressure fuel pump monitoring period overlap within a predetermined range (517), it is determined that there is synthetic noise.

In the case of a control device including an opening and closing valve detection function capable of detecting the actual valve opening timing and the actual valve closing timing with high accuracy, by performing high-speed sampling of the drive voltage or the drive current of the fuel injection valve (105), and then performing differentiation processing for the valve body behavior (503) for a plurality of times, a fuel injection valve monitoring period including a fuel injection valve opening monitoring period (610) of a predetermined period based on the actual valve opening timing, and a fuel injection valve closing monitoring period (611) of a predetermined period based on the actual closed valve timing may be set (see also FIG. 6), and the fuel injection valve monitoring period and the high pressure fuel pump monitoring period may be compared so that occurrence of synthetic noise is determined. Thereby, each predetermined period can be set to be shorter, and the individual difference caused for each fuel injection valve (105) can be detected with high accuracy, so that the effect of the present invention can be maximized.

<Control Example of Variable Valve Mechanism by ECU (Part 1)>

Figure 6:
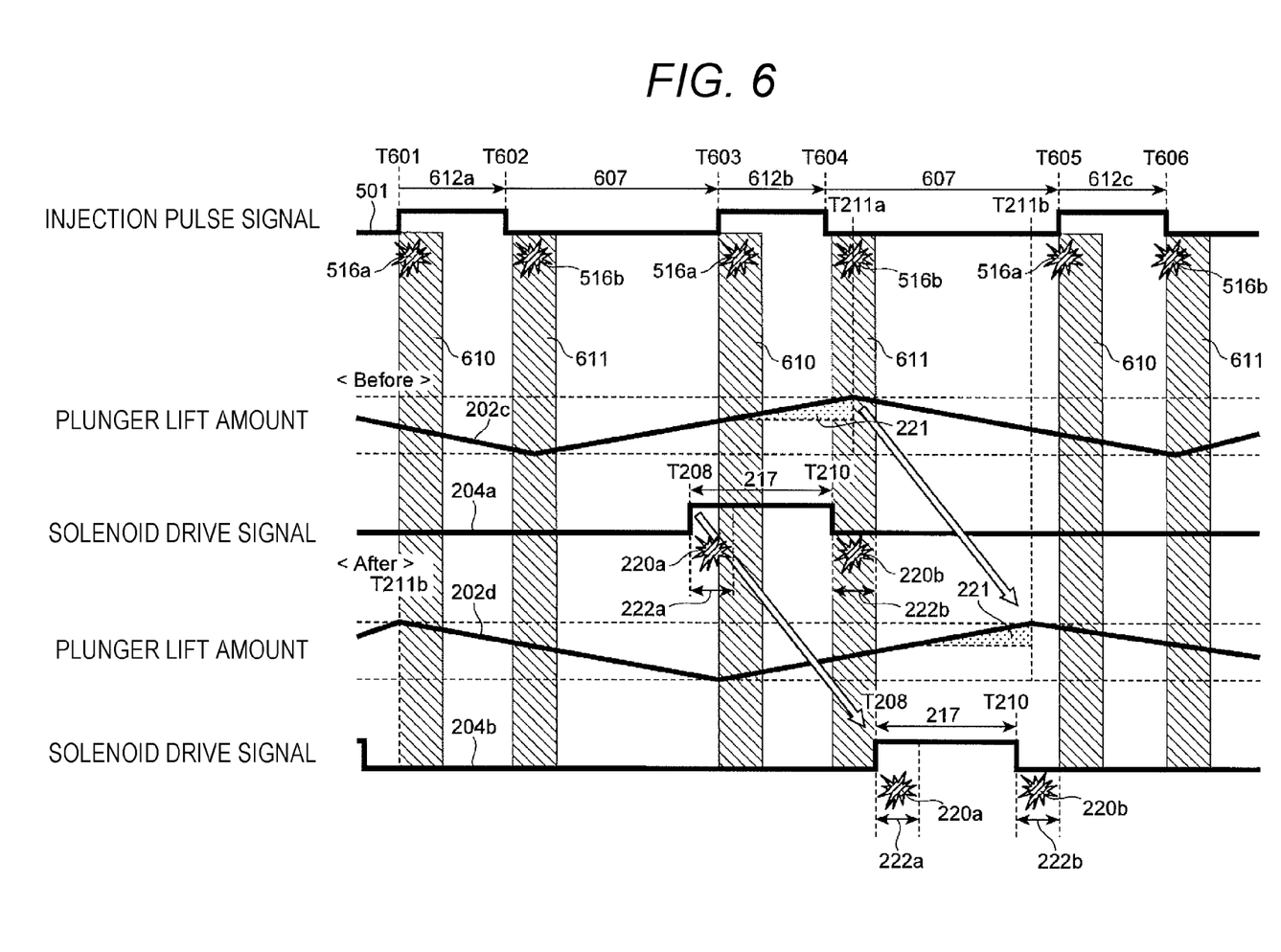
FIG. 6 is a control explanatory diagram for explaining an example of control of the variable valve mechanism by an ECU shown in FIG. 1.

An example of control of the variable valve mechanism by the ECU (109) shown in FIG. 1 will be described with reference to FIG. 6. The uppermost part of FIG. 6 shows the injection pulse signal (501), and in FIG. 6, three-stage injection is performed. Below that, the plunger lift amount (202*c*) and the solenoid drive signal (204*a*) at the time of synthetic noise generation (before control), and the plunger lift amount (202*d*) and the solenoid drive signal (204*b*) at the time of synthetic noise avoidance (after control) are shown.

First, at T601, the injection pulse signal (501) is turned ON, the valve opening noise (516*a*) described in FIG. 5 occurs, and even when the injection pulse signal (501) is turned OFF at T602, the valve closing noise (516*b*) occurs. Therefore, as described above, the fuel injection valve monitoring period including the fuel injection valve opening monitoring period (610) and the fuel injection valve closing monitoring period (611) is set.

The injection pulse signal (501) repeats the ON operation (T603, T605) and the OFF operation (T604, T606) afterwards, and since this is similar to the above description, the details will be omitted.

Here, for the injection pulse signal (501), there are ON periods (612*a*, 612*b*, 612*c*) and an OFF period (607), and the OFF period (607) is a period in which requirement of injection intervals due to the constraint of the valve closing response (515) of the fuel injection valve (105) described in FIG. 5 and the pressurizing period (514) of the high voltage (502).

Next, the plunger lift amount (202c) of the high pressure fuel pump (125) is controlled by the VTC mechanism part (variable valve mechanism) (303) in the control mount determined from the combustion request, the exhaust request, or the like of the internal combustion engine (101). However, in a case in which generation of the valve opening noise (220a) of the high pressure fuel pump (125) in the fuel injection valve opening monitoring period (610) set for the T603 being the ON timing of the injection pulse signal (501), and the valve closing noise (220b) of the high pressure fuel pump (125) in the fuel injection valve closing monitoring period (611) set for 1604 being the OFF timing of the injection pulse signal (501), is predicted, on the basis of the drive timings (drive start timing T603, drive end timing T604) of the injection pulse signal (501) (that is, while the drive timing of the injection pulse signal (501) is maintained), the control amount of the VTC mechanism part (303) is operated, and as a result, the position of the top dead center of the high pressure fuel pump (125) is made variable (T211a→T211b) (in this case, retarded).

As described above, the plurality of ON/OFF timings including multistage injection is determined from the combustion request of the internal combustion engine (101), and the change in the injection mode may have a great influence on the internal combustion engine (101). As the present embodiment, when the valve timing is changed by using the VTC mechanism part (303), although the amount of air sucked into the combustion chamber (121), the suction speed, and the flow mode are changed, the operation state of the internal combustion engine (101) is not significantly affected in a low load region (region where the air amount is reduced) where reduction of the synthetic noise is required, especially in the idle operation.

At the time of avoiding the synthetic noise, the drive timing of the solenoid drive signal (204b) is changed (shifted) to the retard side as compared with the time of generation of the synthetic noise. However, there is no change with respect to each of the top dead centers (T211a, T211b) (that is, the relative relationship with the top dead center (T211a, T211b) does not change), and it is only relative retardation with respect to the change (202c-202d) of the plunger lift amount. As a result, the fuel discharge amount (221) of the high pressure fuel pump (125) does not change. Therefore, a phenomenon inducing a variation in injection amount such as an increase in fuel pressure pulsation is also suppressed.

In the example shown in FIG. 6, the OFF (drive stop) period (607) of the injection pulse signal (501) is longer than the ON (drive) period (217) of the solenoid drive signal (204a, 204b). In this case, when the operating angle of the VTC mechanism part (303) is made variable, the valve opening noise (220a) and the valve closing noise (220b) of the high pressure fuel pump (125) can be moved to the OFF period (607) of the injection pulse signal (501).

Therefore, for example, since the top dead center position (T211a) of the high pressure fuel pump (125) and the ON timing (T208) of the solenoid drive signal (204a) are already known, the operating angle of the VTC mechanism part (303) is varied such that the ON timing (T208) of the solenoid drive signal (204a) is set on or after the fuel injection valve closing monitoring period (611) set on the basis of the drive end timing (T604) of the fuel injection valve (105). At this time, if the operating angle of the VTC mechanism part (303) can be made variable such that the ON period (217) of the solenoid drive signal (204a, 204b) of the high pressure fuel pump (125) is set (included) within the OFF period (607) of the injection pulse signal (501) of the fuel injection valve (105), more specifically, high pressure fuel pump closing monitoring period (222b) set on the basis of the OFF timing (T210) of the solenoid drive signal (204a) is set on or before the fuel injection valve opening monitoring period (610) set on the basis of the drive start timing (T605) of the next fuel injection valve (105), it is possible to reliably avoid the generation of synthetic noise of the drive noise (516a, 516b) of the fuel injection valve (105) and the drive noise (220a, 220b) of the high pressure fuel pump (125).

By such control, the top dead center of the high pressure fuel pump (125) moves from T211a to T211b, for the solenoid drive signal (204b) as described above, both the valve opening noise (220a) and the valve closing noise (220b) of the high pressure fuel pump (125) deviate from the noise position of the fuel injection valve (105), the synthetic noise can be reduced, the discharge amount (221) of the high pressure fuel pump (125) does not increase or decreases, and the operation state of the internal combustion engine (101) is not affected.

<Control Example of Variable Valve Mechanism by ECU (Part 2)>

Next, another example of control of the variable valve mechanism by the ECU (109) shown in FIG. 1 will be described with reference to FIG. 7.

Figure 7:
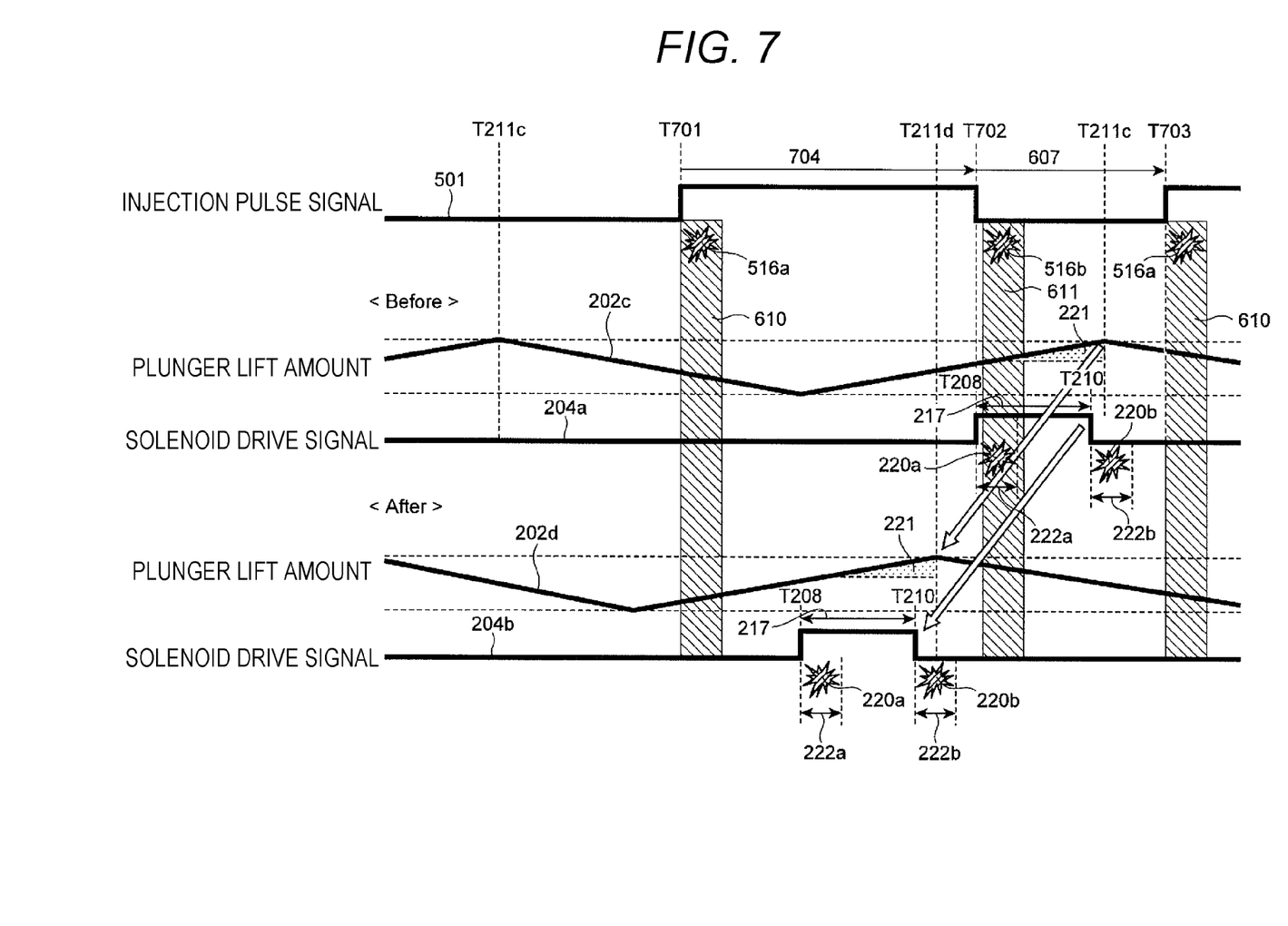
FIG. 7 is a control explanatory diagram for explaining another example of control of the variable valve mechanism by the ECU shown in FIG. 1.

In the example shown in FIG. 7, a case is shown in which the ON period (704) of the injection pulse signal (501) is longer than the ON period (217) of the solenoid drive signal (204a, 204b). In this example, by the synthetic noise prediction determination described above, when the top dead center (T211c) of the high pressure fuel pump (125) is varied by using the VTC mechanism part (303), it is considered that the synthetic noise can be reduced by moving the top dead center (T211c) to the ON period (704) side of the injection pulse signal (501) (in this case, to the advance side). Therefore, the operating angle of the VTC mechanism part (303) is the period from T211c to T211d.

Therefore, for example, the operating angle of the VTC mechanism part (303) is varied such that the ON timing (T208) of the solenoid drive signal (204a) is set on or after the fuel injection valve opening monitoring period (610) set on the basis of the drive start timing (T701) of the fuel injection valve (105). At this time, if the operating angle of the VTC mechanism part (303) can be made variable such that the ON period (217) of the solenoid drive signal (204a, 204b) of the high pressure fuel pump (125) is set (included) within the ON period (704) of the injection pulse signal (501) of the fuel injection valve (105), more specifically, high pressure fuel pump closing monitoring period (222b) set on the basis of the OFF timing (T210) of the solenoid drive signal (204a) is set on or before the fuel injection valve closing monitoring period (611) set on the basis of the drive end timing (T702) of the fuel injection valve (105), it is possible to reliably avoid the generation of synthetic noise of the drive noise (516a, 516b) of the fuel injection valve (105) and the drive noise (220a, 220b) of the high pressure fuel pump (125).

By such control, as similar to the example shown in FIG. 6, the discharge amount (221) of the high pressure fuel pump (125) does not increase or decrease, the operation state of the internal combustion engine (101) is not affected, both the valve opening noise (220a) and the valve closing noise (220b) of the high pressure fuel pump (125) deviate from the noise position of the fuel injection valve (105), and the synthetic noise can be reduced.

<Control Example of Variable Valve Mechanism by ECU (Part 3)>

Next, still another example of control of the variable valve mechanism by the ECU (109) shown in FIG. 1 will be described with reference to FIG. 8. In this example, valve overlap between the intake valve (103) and the exhaust valve (104) will be described.

Figure 8:
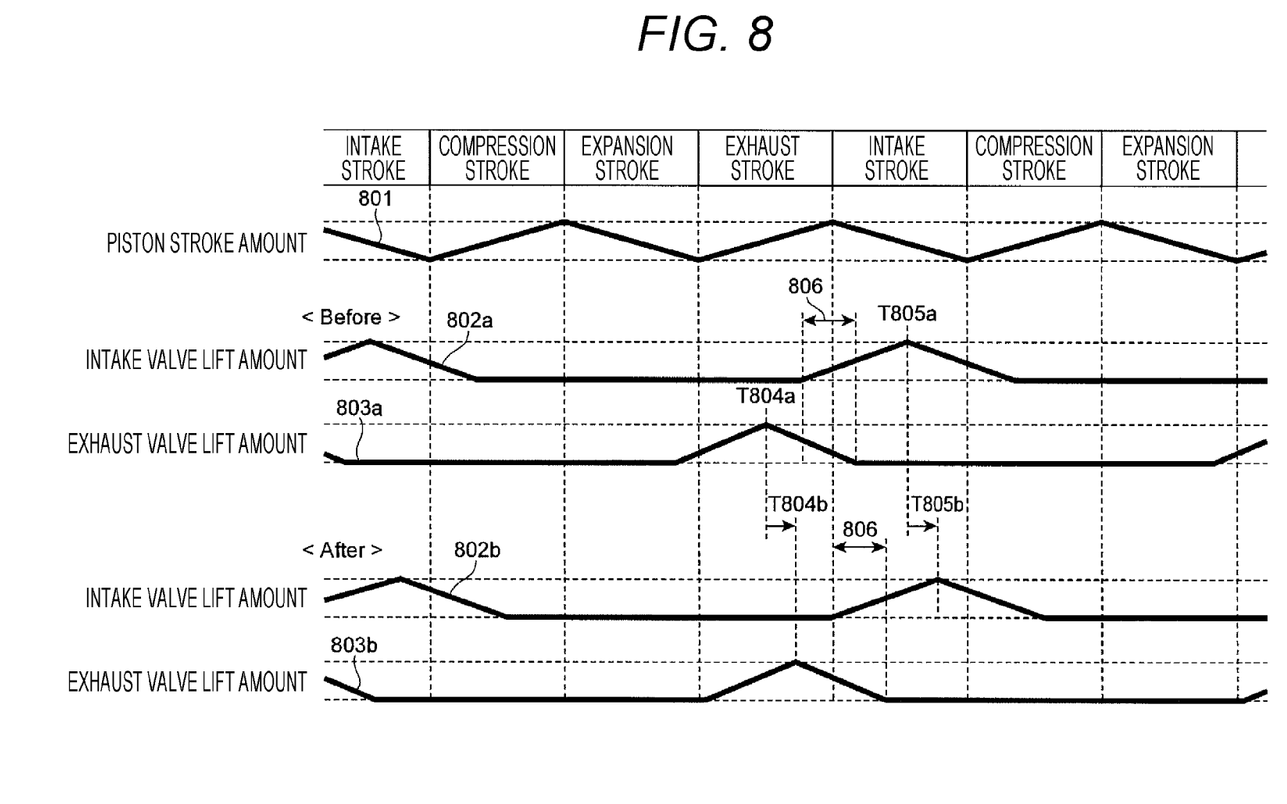
FIG. 8 is a control explanatory diagram for explaining still another example of control of the variable valve mechanism by the ECU shown in FIG. 1.

In FIG. 8, reference numeral 801 indicates the stroke amount of the piston (102) of the internal combustion engine (101), 802a indicates the lift amount of the intake valve (103) at the time of synthetic noise generation (before control), 803a indicates the lift amount of the exhaust valve (104) at the time of synthetic noise generation (before control), 802b indicates the lift amount of the intake valve (103) at the time of avoiding synthetic noise (after control), and 803b indicates the lift amount of the exhaust valve (104) at the time of avoiding synthetic noise (after control). Here, a period in which both the intake valve (103) and the exhaust valve (104) are open (in other words, a period in which the valve opening period of the intake valve (103) and the valve opening period of the exhaust valve (104) overlap with each other) (806) is referred to as a valve overlap (amount), which is an important parameter affecting the intake and exhaust performance of the internal combustion engine (101). Therefore, both the intake valve (103) and the exhaust valve (104), including the period of the valve overlap (806), are designed to perform the valve opening and closing operation at the timing corresponding to the characteristics of the internal combustion engine (101).

In the present embodiment, in order to reduce the synthetic noise, as described above, the VTC mechanism part (303) of the cam (for example, the exhaust cam) that drives the high pressure fuel pump (125) is made variable (T804a→T804b, or T805a→T805b). Therefore, there is a possibility that the valve overlap (806) may be changed in some cases.

Therefore, in this example, when the VTC mechanism part (303) of the cam (for example, the exhaust cam) that drives the high pressure fuel pump (125) is made variable in order to reduce synthetic noise, the VTC mechanism part (303) of the other cam (that is, the cam that does not drive the high pressure fuel pump (125), for example, the intake cam) is also made variable at the same time (that is, both the intake and exhaust) such that the valve overlap (amount) (806) is the same (does not change).

With such control, it is possible to further reduce synthetic noise without affecting the operating state of the internal combustion engine (101).

In the operation of the operating angle of the VTC mechanism part (303) described with reference to FIGS. 6 and 7, when the region where the noise can be reduced is in both the ON period (612a, 612b, 612c, 704) of the injection pulse signal (501), and the OFF period (607) of the injection pulse signal (501), it is more preferable that the VTC mechanism part (303) is varied to the side where the change amount of the operating angle of the VTC mechanism part (303) is smaller for each of the advance side and the retard side. As a result, it is possible to reduce synthetic noise while reducing the influence on the operating state of the internal combustion engine (101).

<Operation and Effects of Variable Valve Mechanism Control by ECU>

As the prior art described above, for example, when the ON timing (T208) and the OFF timing (T210) of the solenoid drive signal (204) of the high pressure fuel pump (125) is made variable, the discharge amount (221) of the high pressure fuel pump (125) changes every time, so that the fuel pressure pulsation increases, which causes large shot variation of the injection amount, and therefore, the combustion stability may be impaired. When the injection timing including multistage injection that has been described with reference to FIG. 5 is made variable, the injection timing determined from a combustion request of an internal combustion engine (101) is ignored, which also may cause deterioration of combustion.

According to the control device (ECU) of the internal combustion engine of the present embodiment, when it is determined that there is synthetic noise of the high pressure fuel pump (125) and the fuel injection valve (105), while satisfying the fuel injection request (for example, the required fuel pressure and the required injection amount) of the fuel injection valve (105), the operating angle of the variable valve mechanism provided in the internal combustion engine (101) is made variable. Thus, from the characteristics of the high pressure fuel pump (125) that has been described with reference to FIG. 2, since it is not necessary to change the ON timing (T208) and OFF timing (T210) of the solenoid drive signal (204) on the drive cam angle of the high pressure fuel pump (125), the discharge amount (221) of the high pressure fuel pump (125) does not change, and the driving timing of the fuel injection valve (105) is not changed, it is possible to avoid deterioration of combustion, reliably reduce synthetic noise without affecting the operation state of the internal combustion engine (101), and therefore, improve the merchantability of the fuel subsystem.

In particular, during the idle operation of the internal combustion engine (101), the synthetic noise becomes conspicuous, and even if the valve timing is changed using the VTC mechanism part (303), the influence on the operating state of the internal combustion engine (101) is small. Thus, the synthetic noise can be reduced more effectively without affecting the operating state of the internal combustion engine (101).

The present invention is not limited to each of the embodiments described above, and various modifications are included. Each of the embodiments described above has been described in detail in order to explain the present invention in an easy-to-understand manner, and the present invention is not necessarily limited to those having all the configurations described in the embodiments.

Each component, function, processing unit, processing means, and the like described above may be realized by hardware, for example, by designing apart or all of them in an integrated circuit, or the like. Each component, function, and the like may be realized by software by interpreting and executing a program that the processor realizes each function. Information such as programs, tables, files, and the like that realize each function can be stored in a storage device such as a memory, a hard disk, or a solid state drive (SSD), or a storage medium such as an IC card, an SD card, or a DVD.

Also, control lines and information lines indicate what is considered to be necessary for explanation, and all control lines and information lines are not necessarily shown in the product. In practice, it can be considered that almost all the structures are mutually connected.

REFERENCE SIGNS LIST 101 internal combustion engine (in-cylinder direct injection internal combustion engine)

102 piston
103 intake valve
104 exhaust valve
105 fuel injection valve
109 ECU (control device of internal combustion engine)
110 intake pipe
111 exhaust pipe
121 combustion chamber
123 fuel tank
124 low pressure fuel pump
125 high pressure fuel pump
127 fuel injection valve control device
129 exhaust cam
202c plunger lift amount at the time of synthetic noise generation
202d plunger lift amount at the time of avoiding synthetic noise
204a solenoid drive signal
T208 solenoid drive signal ON timing
T210 solenoid drive signal OFF timing
T211a top dead center position before VTC varying
T211b top dead center position after VTC varying
217 solenoid drive signal ON period
220a valve opening noise of high pressure fuel pump
220b valve closing noise of high pressure fuel pump
222a high pressure fuel pump valve opening monitoring period
222b high pressure fuel pump valve closing monitoring period
303 VTC mechanism part (variable valve mechanism)
501 injection pulse signal
516a valve opening noise of fuel injection valve
516b valve closing noise of fuel injection valve
T601 injection pulse signal ON timing
T602 injection pulse signal OFF timing
T603 injection pulse signal ON timing
T604 injection pulse signal OFF timing
T605 injection pulse signal ON timing
T606 injection pulse signal OFF timing
607 Injection pulse signal OFF period
610 fuel injection valve opening monitoring period
611 fuel injection valve closing monitoring period

The invention claimed is:

1. A control device for an in-cylinder direct injection internal combustion engine comprising: a fuel injection valve that directly injects fuel into a cylinder; a high pressure fuel pump that pressurizes fuel to be supplied to the fuel injection valve; and a variable valve mechanism that can make a valve timing or a lift amount of an intake valve or an exhaust valve, variable
wherein the control device predicts occurrence of generation of synthetic noise generated when drive noise of the fuel injection valve and drive noise of the high pressure fuel pump overlap in timing, and when determining that there is synthetic noise, makes an operating angle of the variable valve mechanism variable while satisfying a fuel injection request of the fuel injection valve.

2. The control device for an internal combustion engine according to claim 1,
wherein, when it is determined that there is synthetic noise, an operating angle of the variable valve mechanism coupled to a drive cam of the high pressure fuel pump is made variable on the basis of a drive timing of the fuel injection valve.

3. The control device for an internal combustion engine according to claim 2,
wherein, when it is determined that there is synthetic noise, and a drive stop period of the fuel injection valve is longer than a drive period of the high pressure fuel pump, the operating angle of the variable valve mechanism is made variable on the basis of a drive end timing of the fuel injection valve.

4. The control device for an internal combustion engine according to claim 3,
wherein the operating angle of the variable valve mechanism is made variable such that a drive start timing of the high pressure fuel pump is set after a predetermined period from the drive end timing of the fuel injection valve, and the drive period of the high pressure fuel pump is set within a drive stop period of the fuel injection valve.

5. The control device for an internal combustion engine according to claim 2,
wherein, when it is determined that there is synthetic noise, and a drive period of the fuel injection valve is longer than a drive period of the high pressure fuel pump, the operating angle of the variable valve mechanism is made variable on the basis of a drive start timing of the fuel injection valve.

6. The control device for an internal combustion engine according to claim 5,
wherein the operating angle of the variable valve mechanism is made variable such that a drive start timing of the high pressure fuel pump is set after a predetermined period from the drive start timing of the fuel injection valve, and the drive period of the high pressure fuel pump is set within a drive period of the fuel injection valve.

7. The control device for an internal combustion engine according to claim 1,
wherein, when the operating angle of the variable valve mechanism coupled to a cam on the intake valve side or the exhaust valve side that drives the high pressure fuel pump is made variable, a variable valve mechanism coupled to the cam on the exhaust valve side or the intake valve side that does not drive the high pressure fuel pump is also driven such that a valve overlap amount of a valve opening period of the intake valve and a valve opening period of the exhaust valve does not change.

8. The control device for an internal combustion engine according to claim 1,
wherein the operating angle of the variable valve mechanism is operated for each of an advance side and a retard side, and then the operating angle is varied toward a side where a change amount of the operating angle is small.

9. The control device for an internal combustion engine according to claim 1,
wherein at the time of idle operation of the internal combustion engine, the operating angle of the variable valve mechanism is made variable.

10. The control device for an internal combustion engine according to claim 1,
wherein a fuel injection valve monitoring period is set, the fuel injection valve monitoring period including: a fuel injection valve opening monitoring period in which a first predetermined period from a drive start timing of the fuel injection valve is provided; and a fuel injection valve closing monitoring period in which a second predetermined period from a drive end timing of the fuel injection valve is provided, a high pressure fuel pump monitoring period is set in which a third predetermined period is provided from any one or more of a drive start timing of the high pressure fuel pump, a drive end timing of the high pressure fuel pump, a top dead center of a pump piston of the high pressure fuel pump, and a bottom dead center of the pump piston of the high pressure fuel pump, and when the fuel injection valve monitoring period and the high pressure fuel pump monitoring period overlap with each other, or in a case where the control device has a valve opening and closing detection function with which at least one of an actual valve opening timing and an actual valve closing timing corresponding to valve body behavior of the fuel injection valve can be detected, a fuel injection valve monitoring period is set, the fuel injection valve monitoring period including: a fuel injection valve opening monitoring period in which a first predetermined period from an actual valve opening timing of the fuel injection valve detected by the valve opening and closing detection function is provided; and a fuel injection valve closing monitoring period in which a second predetermined period from an actual valve closing timing of the fuel injection valve detected by the valve opening and closing detection function is provided, a high pressure fuel pump monitoring period is set in which a third predetermined period is provided from any one or more of a drive start timing of the high pressure fuel pump, a drive end timing of the high pressure fuel pump, a top dead center of a pump piston of the high pressure fuel pump, and a bottom dead center of the pump piston of the high pressure fuel pump, and when the fuel injection valve monitoring period and the high pressure fuel pump monitoring period overlap with each other, the control device determines that there is synthetic noise.

* * * * *